United States Patent
Mukai

(10) Patent No.: US 9,645,779 B2
(45) Date of Patent: May 9, 2017

(54) JOB PROCESSING APPARATUS, INFORMATION DISPLAYING APPARATUS, INFORMATION PROCESSING SYSTEM, JOB ITEM DISPLAYING METHOD, AND PROGRAM

(71) Applicant: Kyohhei Mukai, Kanagawa (JP)

(72) Inventor: Kyohhei Mukai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/668,461

(22) Filed: Mar. 25, 2015

(65) Prior Publication Data
US 2015/0277830 A1  Oct. 1, 2015

(30) Foreign Application Priority Data

Mar. 31, 2014  (JP) .................................. 2014-070963

(51) Int. Cl.
*G06F 15/00* (2006.01)
*G06F 3/12* (2006.01)

(52) U.S. Cl.
CPC .......... *G06F 3/1268* (2013.01); *G06F 3/1205* (2013.01); *G06F 3/126* (2013.01); *G06F 3/1288* (2013.01); *G06F 3/1238* (2013.01)

(58) Field of Classification Search
CPC ..................................................... G06F 3/1268
USPC ................................................ 358/1.13–1.16
See application file for complete search history.

(56) References Cited

U.S. PATENT DOCUMENTS

2013/0016395 A1 * 1/2013 Akutsu ................. G06F 3/1219
358/1.15

FOREIGN PATENT DOCUMENTS

JP   2006-085615   3/2006
JP   2012-022452   2/2012

* cited by examiner

*Primary Examiner* — Saeid Ebrahimi Dehkord
(74) *Attorney, Agent, or Firm* — Harness, Dickey & Pierce, P.L.C.

(57) ABSTRACT

A job processing apparatus for displaying job items. The apparatus includes a display unit that displays a collection of the job items as many as a specific number of the job items being obtained from each of at least one information storage device in response to a request, the request indicating both the specific number and a first condition specifying which of the job items are to be obtained; and a job item request unit that responds to a user operation by sending to the at least one information storage device a request indicating both the specific number and a second condition specifying which of the job items are to be obtained, thereby obtaining from the at least one information storage device the specific number of job items that are different from the specific number of original job items, wherein the second condition is different from the first condition.

20 Claims, 16 Drawing Sheets

FIG.9

| USER NAME | PASSWORD |
|---|---|
| UserA | aula |
| UserB | best |
| UserC | cup |

FIG.10

| NUMBER OF JOB ITEMS TO BE OBTAINED | 2 |
|---|---|
| JOB ITEM DISPLAY ORDER SETTING INFORMATION | CHRONOLOGICAL ORDER |

FIG.11

| JOB ID | USER NAME | FILE NAME | DATE | TIME |
|---|---|---|---|---|
| 01 | UserA | gg.txt | 2014/02/25 | 14:50:10 |
| 02 | UserB | bb.txt | 2014/02/24 | 10:20:08 |
| 03 | UserC | cc.txt | 2014/02/24 | 11:23:42 |
| 04 | UserA | ll.txt | 2014/02/23 | 10:04:20 |
| 05 | UserB | ee.txt | 2014/02/26 | 16:10:20 |
| 06 | UserB | ff.txt | 2014/02/27 | 17:24:02 |
| 07 | UserA | aa.txt | 2014/02/21 | 09:10:32 |
| 08 | UserC | hh.txt | 2014/02/24 | 11:34:21 |
| 09 | UserC | zz.txt | 2014/02/20 | 14:47:13 |
| 10 | UserC | jj.txt | 2014/02/25 | 13:23:54 |
| 11 | UserB | kk.txt | 2014/02/10 | 08:50:22 |

FIG.12

| JOB ID | USER NAME | FILE NAME | DATE | TIME |
|---|---|---|---|---|
| 01 | UserA | dd.txt | 2014/02/27 | 13:50:10 |
| 02 | UserB | mm.txt | 2014/02/24 | 10:20:08 |
| 03 | UserC | nn.txt | 2014/02/24 | 11:23:42 |
| 04 | UserA | oo.txt | 2014/02/23 | 11:16:31 |
| 05 | UserA | pp.txt | 2014/02/26 | 16:10:20 |
| 06 | UserB | qq.txt | 2014/02/27 | 17:24:02 |
| 07 | UserA | rr.txt | 2014/02/28 | 09:10:32 |
| 08 | UserC | ss.txt | 2014/02/24 | 11:34:21 |
| 09 | UserA | ttt.txt | 2014/02/27 | 14:47:13 |
| 10 | UserC | uu.txt | 2014/02/25 | 13:23:54 |
| 11 | UserB | vv.txt | 2014/02/10 | 08:50:22 |

FIG.13

| JOB ID | USER NAME | FILE NAME | DATE | TIME |
|---|---|---|---|---|
| 01 | UserA | 11.txt | 2014/02/25 | 13:50:10 |
| 02 | UserB | 22.txt | 2014/02/24 | 10:20:08 |
| 03 | UserC | 33.txt | 2014/02/24 | 11:23:42 |
| 04 | UserC | 44.txt | 2014/02/23 | 10:04:20 |
| 05 | UserA | 55.txt | 2014/02/26 | 16:10:20 |
| 06 | UserB | 66.txt | 2014/02/27 | 17:24:02 |
| 07 | UserA | 77.txt | 2014/02/21 | 12:53:28 |
| 08 | UserC | 88.txt | 2014/02/24 | 11:34:21 |
| 09 | UserA | 99.txt | 2014/02/20 | 14:47:13 |
| 10 | UserC | 101.txt | 2014/02/25 | 13:23:54 |
| 11 | UserB | 102.txt | 2014/02/10 | 08:50:22 |

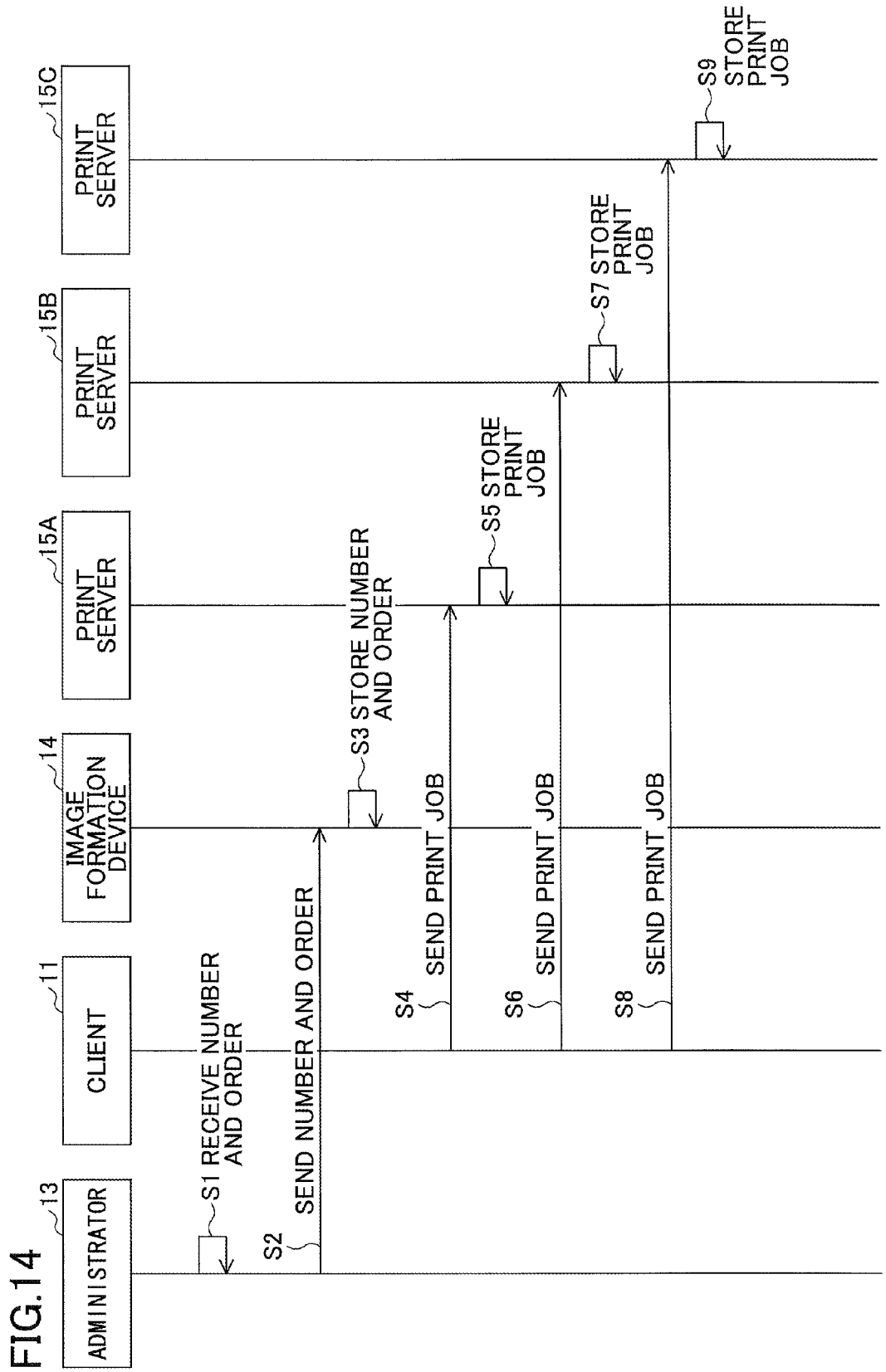

FIG.17

| UserA | | OLD | NEW | SORT |

99.txt
2014/02/20 14:47:13 aa.txt
2014/02/21 09:10:32

77.txt
2014/02/21 12:53:28 ll.txt
2014/02/23 10:04:20                PRINT oo.txt
2014/02/23 11:16:31                DELETE pp.txt
2014/02/26 16:10:20

FIG.19

| UserA | | OLD | NEW | SORT | gg.txt
2014/02/25 14:50:10 ll.txt
2014/02/23 10:04:20 rr.txt
2014/02/28 09:10:32 ttt.txt
2014/02/27 14:47:13

PRINT 55.txt
2014/02/26 16:10:20

DELETE 11.txt
2014/02/25 13:50:10

FIG.20

| UserA | | OLD | NEW | SORT | rr.txt
2014/02/28 09:10:32 ttt.txt
2014/02/27 14:47:13

55.txt
2014/02/26 16:10:20 gg.txt
2014/02/25 14:50:10     PRINT 11.txt
2014/02/25 13:50:10     DELETE ll.txt
2014/02/23 10:04:20

JOB PROCESSING APPARATUS, INFORMATION DISPLAYING APPARATUS, INFORMATION PROCESSING SYSTEM, JOB ITEM DISPLAYING METHOD, AND PROGRAM

BACKGROUND OF THE INVENTION

1. Field of the Invention

The present invention relates to a job processing apparatus, an information displaying apparatus, an information processing system, a job item displaying method, and a program.

2. Description of the Related Art

There have been printing systems that store a print job related to a print instruction from a client device, for example, in a server and execute the print job, stored on the server, using a printing device based on authentication by an authentication device. In these printing systems, items of print jobs authorized to be printed are obtained from the server by authentication to get permission of printing and a desired print job is selected based on the items of print jobs displayed on a display unit (see Patent Document 1, for example).

When a job processing apparatus such as an image formation device for processing a job such as a print job obtains a job item from an information storage device such as a server for storing jobs, a number of job items to be obtained may be set. Accordingly, if a number of jobs stored in the information storage device exceeds the number of job items to be obtained, a job desired by a user may not be included in the job items.

[Patent Document 1] Japanese Laid-Open Patent Application No. 2006-85615

SUMMARY OF THE INVENTION

In view of the above-mentioned problems, it is a general object of at least one embodiment of the present invention to provide a job processing apparatus capable of obtaining job items anew from an information storage device based on a different condition, an information processing system, a job item displaying method, and a program.

In an embodiment, a job processing apparatus for displaying job items is provided. The job processing includes a display unit configured to display a collection of the job items as many as a specific number of the job items being obtained from each of at least one information storage device in response to a request, the request indicating both the specific number and a first condition specifying which of the job items are to be obtained; and a job item request unit configured to respond to a user operation by sending to the at least one information storage device a request indicating both the specific number and a second condition specifying which of the job items are to be obtained, thereby obtaining from the at least one information storage device the specific number of job items that are different from the specific number of job items originally obtained, wherein the second condition is different from the first condition.

According to an embodiment of the present invention, it is possible to obtain job items anew with a different condition from an information storage device.

BRIEF DESCRIPTION OF THE DRAWINGS

Other objects and further features of embodiments will become apparent from the following detailed description when read in conjunction with the accompanying drawings, in which:

FIG. 9 is a configuration diagram of an example of user authentication information;

FIG. 10 is a configuration diagram of an example of job item display information;

FIG. 11 is a configuration diagram of an example of print job information;

FIG. 12 is a configuration diagram of an example of print job information;

FIG. 13 is a configuration diagram of an example of print job information;

FIG. 14 is a sequence diagram of an example of a process to store a print job;

FIG. 17 is an illustration of an example of an arranged job list screen;

FIG. 19 is an illustration of an example of a job list screen;

FIG. 20 is an illustration of an example of an arranged job list screen;

DESCRIPTION OF THE PREFERRED EMBODIMENTS

In the following, embodiments of the present invention will be described in detail with reference to the accompanying drawings. In a present embodiment, while a printing system 1 including an image formation device 14 is described, the printing system 1 may be an information processing system including a job processing apparatus for processing a job.

First Embodiment

System Configuration

Figure 1:
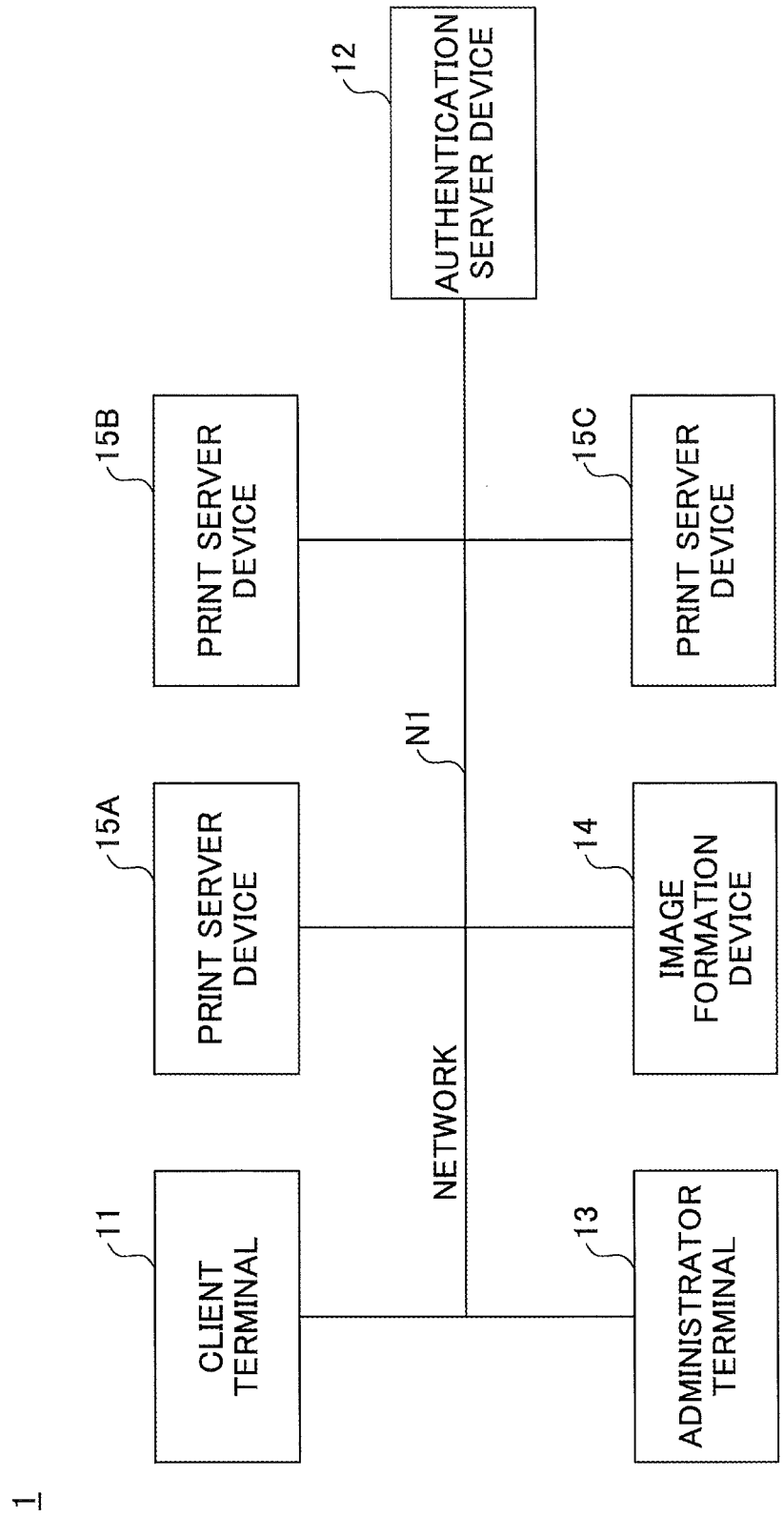
FIG. 1 is a configuration diagram of an example of a printing system according to an embodiment of the present invention.

FIG. 1 is a configuration diagram of the printing system according to the embodiment of the present invention. The printing system 1 includes a client terminal 11, an authentication server device 12, an administrator terminal 13, an image formation device 14, and print server devices 15A-15C, all being interconnected via a network N1 such as a LAN.

The client terminal 11, the authentication server device 12, the administrator terminal 13, the image formation device 14, and the print server devices 15A-15C have a wireless or wired communication unit. While the example shown in FIG. 1 has one client terminal 11, one authentication server device 12, one administrator terminal 13, and one image formation device 14, a plurality of these elements may be disposed. Further, while the example shown in FIG. 1 has three print server devices 15A-15C, their number may be other than three.

The client terminal 11 is a terminal device such as a smartphone, a mobile phone, or a personal computer (PC) used by a user. The client terminal 11 transmits a print job to one of the print server devices 15A-15C.

In the present embodiment, the print job refers to information necessary to cause the image formation device 14 to perform a print process. The print job includes electronic data to be printed or information to specify the electronic data (such as a URL) and printing conditions (color/monochrome, simplex/duplex, and the like).

The authentication server device 12 is realized by at least one information processing apparatus. The authentication server device 12 holds information about authentication such as user authentication information and performs authentication based on a request from the image formation device 14 or the like. The administrator terminal 13 is a terminal device such as a smartphone, a mobile phone, or a PC used by an administrator.

The administrator terminal 13 is a terminal device for managing the authentication server device 12, the image formation device 14, and the print server devices 15A-15C of the printing system 1. The administrator terminal 13 can provide an instruction to the authentication server device 12, the image formation device 14, and the print server devices 15A-15C by using an installed application, for example.

The image formation device 14 is an output device such as a printer, a copier, a multifunction peripheral, a laser printer, or the like. The image formation device 14 uses the authentication server device 12 to authenticate a user, obtains a job item or a print job of a user who is successfully authenticated from the print server devices 15A-15C, and displays or prints the job item.

The print server devices 15A-15C are realized by at least one information processing apparatus. In the following, if any one of the print server devices 15A-15C is used, the print server devices 15A-15C are individually referred to as a print server device 15. The print server device 15 stores a print job and transmits a job item or the print job to the image formation device 14 or the like based on a request from the image formation device 14 or the like. In addition, a configuration of the printing system 1 shown in FIG. 1 is an example and other configurations may be employed.

<Hardware Configuration>

Figure 2:
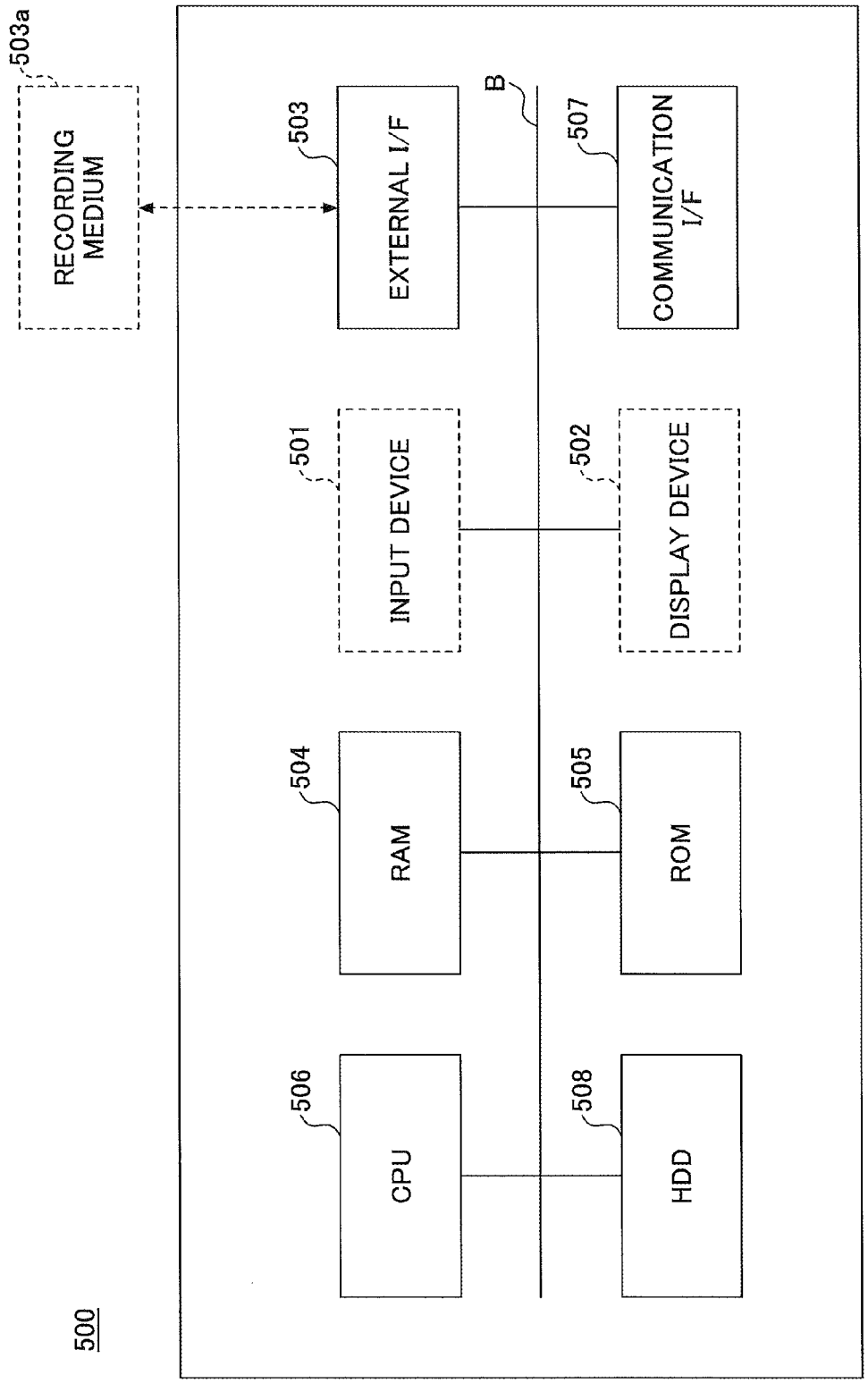
FIG. 2 is a hardware configuration diagram of an example of a computer according to an embodiment.

The client terminal 11, the authentication server device 12, the administrator terminal 13, and the print server device 15 of FIG. 1 are each realized by a computer, for example, having a hardware configuration shown in FIG. 2. FIG. 2 is a hardware configuration diagram of the computer according to the present embodiment.

A computer 500 shown in FIG. 2 includes an input device 501, a display device 502, an external I/F 503, a RAM 504, a ROM 505, a CPU 506, a communication I/F 507, an HDD 508, and the like, all being interconnected via a bus B. The input device 501 and the display device 502 may be connected and used when necessary.

The input device 501 is realized by a keyboard, a mouse, a touch panel, or the like and is used to input various operation signals to the computer 500. The display device 502 is realized by a display screen or the like and displays a result of a process by the computer 500.

The communication I/F 507 is an interface for connecting the computer 500 to the network N1. In accordance with this, the computer 500 can perform data communications via the communication I/F 507.

The HDD 508 is a nonvolatile storage device that stores a program or data. The program or data stored in the HDD 508 includes an OS serving as basic software for controlling an entire portion of the computer 500 and an application for providing various types of functions on the OS. The computer 500 may use, instead of the HDD 508, a drive device (such as Solid State Drive: SSD) that uses a flash memory as a storage medium.

The external I/F 503 is an interface with an external device such as a recording medium 503a. In accordance with this, the computer 500 can read and/or write on the recording medium 503a via the external I/F 503. Examples of the recording medium 503a include a flexible disk, a CD, a DVD, an SD memory card, a USB memory, and the like.

The ROM 505 is a nonvolatile semiconductor memory (storage device) that can hold a program and data even when the computer 500 is powered off. The ROM 505 stores a program and data such as BIOS executed when the computer 500 is started up, an OS setting, a network setting, and the like. The RAM 504 is an example of a volatile semiconductor memory that temporarily holds a program and data.

The CPU 506 is a processor for controlling an entire portion of the computer 500 and realizing functions of the computer 500 by reading out the program or the data from a storage device such as the ROM 505 or the HDD 508 onto the RAM 504 and executing a process.

The client terminal 11, the authentication server device 12, the administrator terminal 13, and the print server device 15 in the present embodiment can perform various types of processes by executing the program on the computer 500 having the above-mentioned hardware configuration, for example.

Figure 3:
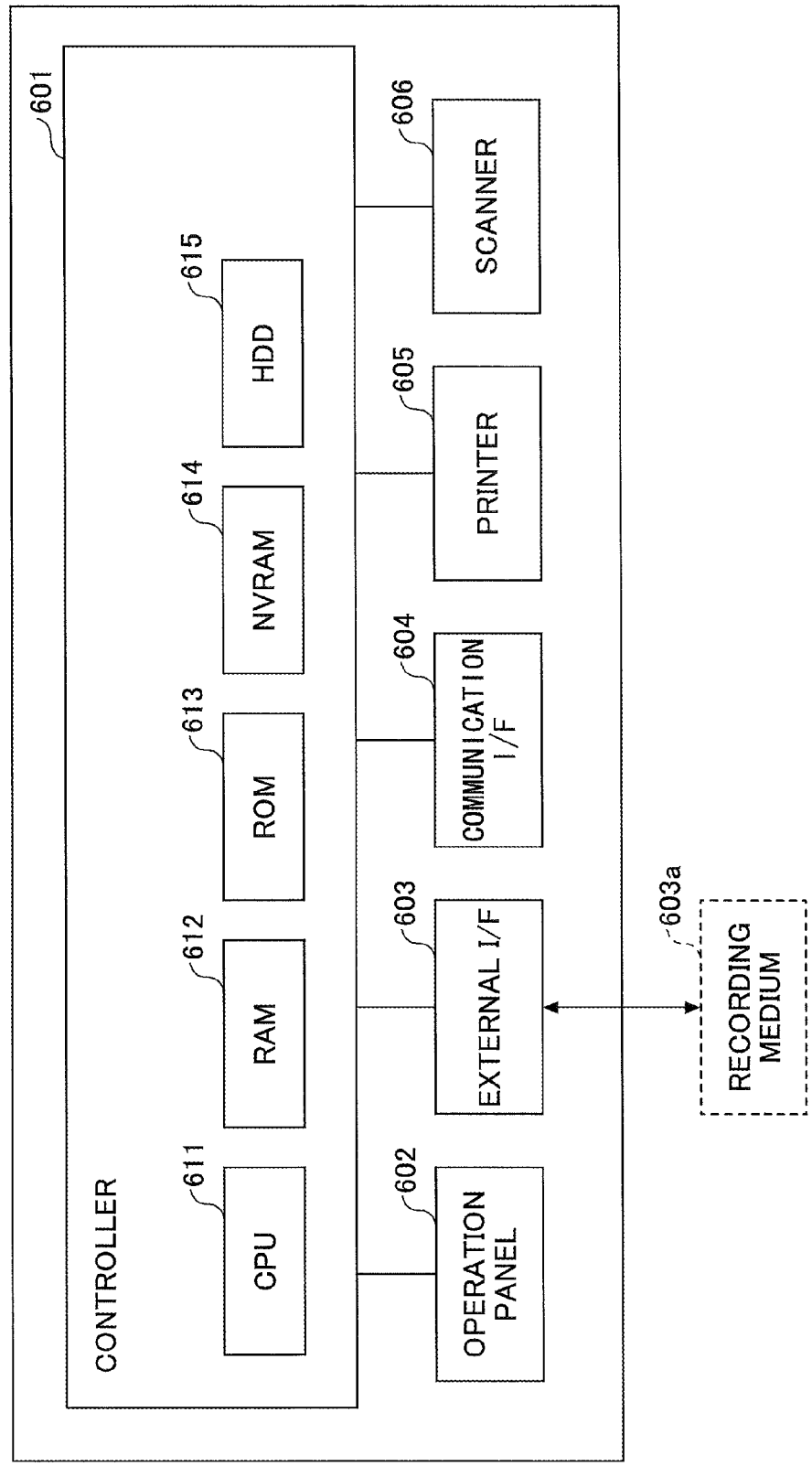
FIG. 3 is a hardware configuration diagram of an example of an image formation device according to an embodiment.

The image formation device 14 in FIG. 1 is realized by a computer having a hardware configuration as shown in FIG. 3, for example. FIG. 3 is a hardware configuration diagram of the image formation device 14 according to the present embodiment. The image formation device 14 shown in FIG. 3 includes a controller 601, an operation panel 602, an external I/F 603, a communication I/F 604, a printer 605, a scanner 606, and the like.

The controller 601 includes a CPU 611, a RAM 612, a ROM 613, an NVRAM 614, an HDD 615, and the like. The ROM 613 stores various types of programs or data. The RAM 612 temporarily stores a program or data. The NVRAM 614 stores setting information, for example. The HDD 615 stores various types of programs or data.

The CPU 611 realizes control of an entire portion of the image formation device 14 and functions of the image formation device 14 by reading out the program, the data, the setting information, or the like from the ROM 613, the NVRAM 614, the HDD 615, of the like onto the RAM 612 and executing a process.

The operation panel 602 includes an input portion that receives an input from a user, and a display portion that performs display. The external I/F 603 is an interface with an external device such as a recording medium 603a. In accordance with this, the image formation device 14 can read and/or write on the recording medium 603a via the external I/F 603. Examples of the recording medium 603*a* include an IC card, a flexible disk, a CD, a DVD, an SD memory card, a USB memory, and the like.

The communication I/F 604 is an interface for connecting the image formation device 14 to the network N1. In accordance with this, the image formation device 14 can perform data communication via the communication I/F 604. The printer 605 is a printing device for printing print data on paper. The scanner 606 is a reading device for reading image data (electronic data) from paper.

<Software Configuration>

<<Client Terminal>>

Figure 4:
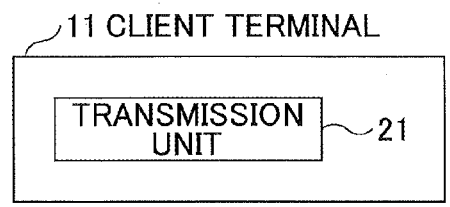
FIG. 4 is a process block diagram of an example of a client terminal according to an embodiment.

The client terminal 11 according to the present embodiment is realized by a process block shown in FIG. 4, for example. FIG. 4 is a process block diagram of the client terminal 11 according to the present embodiment. The client terminal 11 implements a transmission unit 21 by executing a program. The transmission unit 21 transmits a print job including user information to the print server device 15. While the process block diagram in FIG. 4 shows a process block necessary to describe the present embodiment, another process block may be included.

<<Authentication Server Device>>

Figure 5:
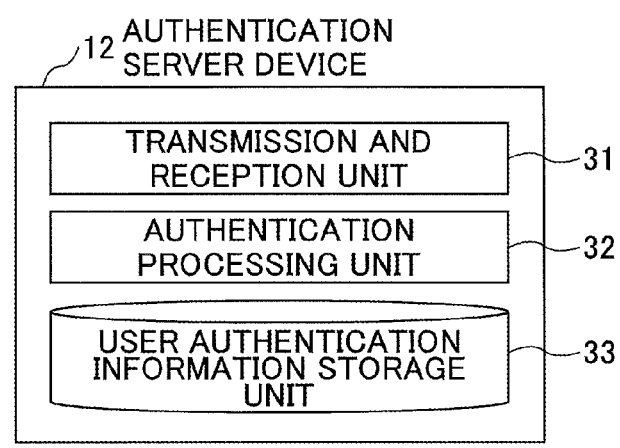
FIG. 5 is a process block diagram of an example of an authentication server device according to an embodiment.

The authentication server device 12 according to the present embodiment is realized by process blocks shown in FIG. 5, for example. FIG. 5 is a process block diagram of an authentication server device according to the present embodiment. The authentication server device 12 in FIG. 5 implements a transmission and reception unit 31, an authentication processing unit 32, and a user authentication information storage unit 33 by executing a program.

The transmission and reception unit 31 receives a user name and a password from the image formation device 14 and transmits a result of authentication to the image formation device 14. The authentication processing unit 32 uses the user authentication information storage unit 33 in order to perform an authentication process. The user authentication information storage unit 33 stores a pair of a user name and a password in advance as user authentication information. For example, the authentication processing unit 32 determines that authentication is successful if the pair of the user name and the password received from the image formation device 14 is stored as user authentication information in the user authentication information storage unit 33.

<<Administrator Terminal>>

Figure 6:
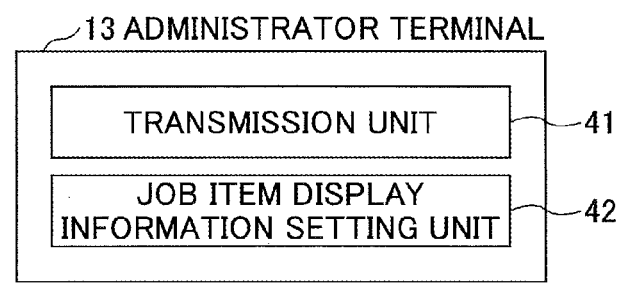
FIG. 6 is a process block diagram of an example of an administrator terminal according to an embodiment.

The administrator terminal 13 according to the present embodiment is realized by process blocks as shown in FIG. 6, for example. FIG. 6 is a process block diagram of the administrator terminal 13 according to the present embodiment. The administrator terminal 13 implements a transmission unit 41 and a job item display information setting unit 42 by executing a program.

The transmission unit 41 transmits a number of job items to be obtained and job item display order setting information to the image formation device 14. The job item display information setting unit 42 receives the number of job items to be obtained and the job item display order setting information from an administrator. While the process block diagram in FIG. 6 shows process blocks necessary to describe the present embodiment, another process block may be included.

<<Image Formation Device>>

Figure 7:
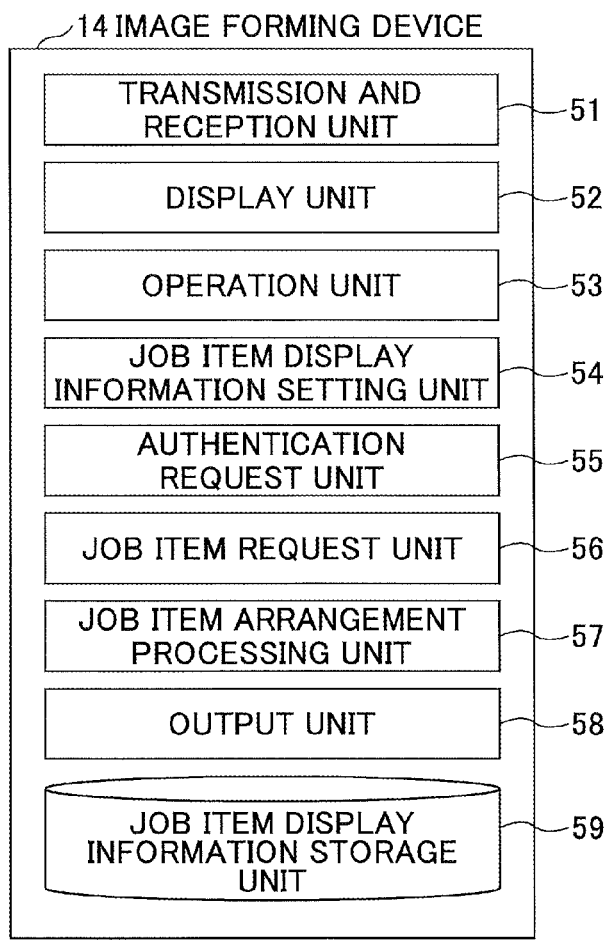
FIG. 7 is a process block diagram of an example of an image formation device according to an embodiment.

The image formation device 14 according to the present embodiment is realized by process blocks as shown in FIG. 7, for example. FIG. 7 is a process block diagram of the image formation device 14 according to the present embodiment. The image formation device 14 implements a transmission and reception unit 51, a display unit 52, an operation unit 53, a job item display information setting unit 54, an authentication request unit 55, a job item request unit 56, a job item arrangement processing unit 57, an output unit 58, and a job item display information storage unit 59 by executing a program.

The transmission and reception unit 51 receives a number of job items to be obtained and job item display order setting information from the administrator terminal 13. The display unit 52 displays job items received from the print server device 15. The operation unit 53 receives a user operation. The job item display information setting unit 54 stores, in the job item display information storage unit 59, the number of job items to be obtained and the job item display order setting information received from the administrator terminal 13.

The authentication request unit 55 transmits a user name and a password to the authentication server device 12 and sends a request for user authentication. The job item request unit 56 sends, in response to a result of successful authentication, a request for job items based on the number of job items to be obtained and the job item display order setting information to the print server devices 15A-15C.

The job item arrangement processing unit 57 arranges job items received from the print server devices 15A-15C. The output unit 58 processes a print job received from the print server device 15. The job item display information storage unit 59 stores the number of job items to be obtained and the job item display order setting information.

<<Print Server Device>>

Figure 8:
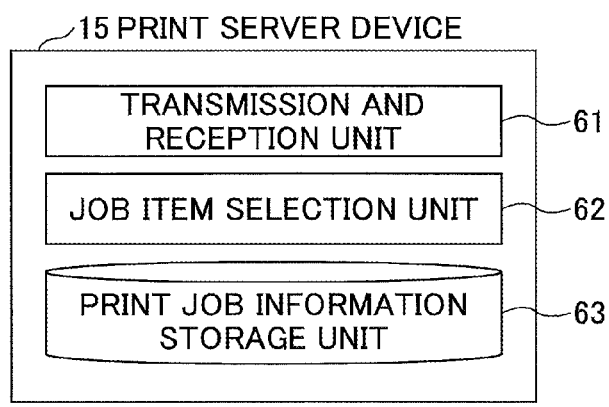
FIG. 8 is a process block diagram of an example of a print server device according to an embodiment.

The print server device 15 according to the present embodiment is realized by process blocks as shown in FIG. 8, for example. FIG. 8 is a process block diagram of the print server device 15 according to the present embodiment. The print server device 15 in FIG. 8 implements a transmission and reception unit 61, a job item selection unit 62, and a print job information storage unit 63 by implementing a program.

The transmission and reception unit 61 transmits job items selected by the job item selection unit 62 to the image formation device 14. Based on a number of job items to be obtained and job item display order setting information that are received, the job item selection unit 62 selects (chooses) job items as many as the number of job items to be obtained as described below. The print job information storage unit 63 stores print job information which is detailed information about the print job.

<<User Authentication Information Stored in the User Authentication Information Storage Unit>>

FIG. 9 is a configuration diagram of user authentication information. The user authentication information in FIG. 9 is stored in the user authentication information storage unit 33 of the authentication server device 12. The user authentication information of FIG. 9 includes a pair of a user name and a password stored in advance in the user authentication information storage unit 33. The authentication processing unit 32 uses the user authentication information of FIG. 9 in order to determine whether user authentication by the user name and the password received from the image formation device 14 is a success or a failure.

<<Job Item Display Information Stored in the Job Item Display Information Storage Unit>>

FIG. 10 is a configuration diagram of an example of the job item display information. The job item display information in FIG. 10 is stored in the job item display information storage unit 59 of the image formation device 14. The job item display information is for managing the number of job items to be obtained and the job item display order setting information. The number of job items to be obtained indicates a number of print jobs that can be obtained from a single print server device 15. For the number of job items to be obtained, one or more is set.

The job item display order setting information is for specifying the order in which job items are displayed. For example, the job item display order setting information specifies the order in which job items are displayed in ascending order/descending order such as chronological order or reverse chronological order. For example, in the job item display information shown in FIG. 10, the print server device 15 selects two print jobs in chronological order and transmits the two selected print jobs to the image formation device 14.

<<Print Job Information Stored in the Print Job Information Storage Unit>>

FIGS. 11-13 are configuration diagrams of print job information. The print job information shown in FIG. 11 is assumed to be stored in the print job information storage unit 63 of the print server device 15A. The print job information shown in FIG. 12 is assumed to be stored in the print job information storage unit 63 of the print server device 15B. The print job information shown in FIG. 13 is assumed to be stored in the print job information storage unit 63 of the print server device 15C.

The print job information has a job ID, a user name, a file name, a date, and time in its fields constituting a job item. The job ID is an example of identification information about a print job. The user name is an example of identification information about a user. The file name is an example of identification information about electronic data to be printed. The date and time indicate a date and time when the print server device 15 received the print job. The print job information is for managing print jobs stored in the print server device 15.

<Details of Process>

In the following, a process of the printing system 1 according to the present embodiment is described in detail.

<<Process to Store a Print Job>>

FIG. 14 is a sequence diagram of a process to store a print job. In step S1, the job item display information setting unit 42 of the administrator terminal 13 receives, from an administrator, a number of job items to be obtained and job item display order setting information to be transmitted to the image formation device 14. In step S2, the transmission unit 41 of the administrator terminal 13 transmits the number of job items to be obtained and the job item display order setting information to the image formation device 14.

In step S3, the transmission and reception unit 51 of the image formation device 14 receives the number of job items to be obtained and the job item display order setting information transmitted by the administrator terminal 13. The job item display information setting unit 54 stores the number of job items to be obtained and the job item display order setting information received from the administrator terminal 13 in the job item display information storage unit 59.

In step S4, the transmission unit 21 of the client terminal 11 transmits a print job including (added) user information to the print server device 15A based on a request to store a print job from a user.

In step S5, the print job information storage unit 63 of the print server device 15A stores, as shown in FIG. 11, print job information as detailed information about the print job received from the client terminal 11. The print job is stored in this manner.

In step S6, the transmission unit 21 of the client terminal 11 transmits the print job including the user information to the print server device 15B based on the request to store a print job from the user.

In step S7, the print job information storage unit 63 of the print server device 15B stores, as shown in FIG. 12, print job information as detailed information about the print job received from the client terminal 11. The print job is stored in this manner.

In step S8, the transmission unit 21 of the client terminal 11 transmits the print job including the user information to the print server device 15C based on the request to store a print job from the user.

In step S9, the print job information storage unit 63 of the print server device 15C stores, as shown in FIG. 13, print job information as detailed information about the print job received from the client terminal 11. The print job is stored in this manner.

The sequence diagram of FIG. 14 shows an example where the print job is transmitted from the client terminal 11 to the print server device 15A, the print server device 15B, and the print server device 15C in this order. However, the order is not limited to this. The client terminal 11 may transmit print jobs successively to the same print server device 15.

<<Process to Display Job Items>>

Figure 15:
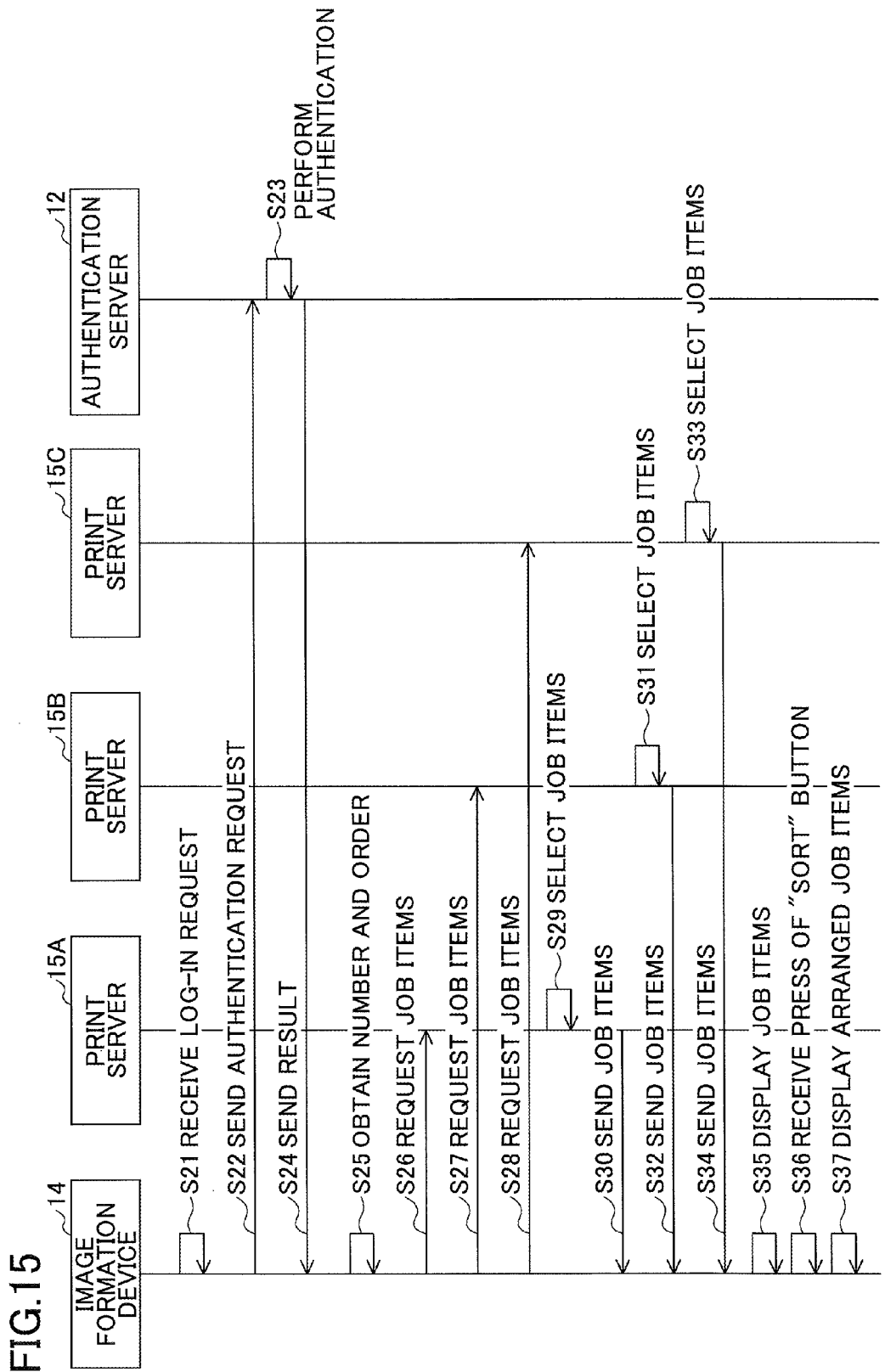
FIG. 15 is a sequence diagram of an example of a process to display job items.

FIG. 15 is a sequence diagram of a process to display job items. In step S21, the user operates the operation panel 602 of the image formation device 14 to send a request to display a log-in screen, for example.

In step S22, the display unit 52 of the image formation device 14 displays the log-in screen on the operation panel 602 based on the request from the user. The operation unit 53 receives an input of user authentication information from the user to the log-in screen. The user authentication information includes a user name, a password, and the like. The authentication request unit 55 transmits the user authentication information input by the user to the authentication server device 12 and sends a request for user authentication.

In step S23, the transmission and reception unit 31 of the authentication server device 12 receives the user authentication information from the image formation device 14. The authentication processing unit 32 uses the user authentication information storage unit 33 in order to perform an authentication process. For example, the authentication processing unit 32 determines that authentication is successful if a pair of the user name and the password included in the user authentication information received from the image formation device 14 is stored as user authentication information in the user authentication information storage unit 33.

In this description, it is assumed that the authentication is determined to be a success. If the authentication is determined to be a failure, a process from step S25 is not performed. The process proceeds to step S24 where the transmission and reception unit 31 of the authentication server device 12 reports the success of authentication as a result of the authentication to the image formation device 14.

In step S25, the job item request unit 56 of the image formation device 14 receives the report of the success of authentication as the result of the authentication and obtains the number of job items to be obtained and the job item display order setting information from the job item display information storage unit 59. The job item request unit 56 sends a request for job items based on the successfully authenticated user, the number of job items to be obtained, and the job item display order setting information to all print server devices 15 storing print jobs.

In other words, the job item request unit 56 sends, to the print server device 15, a request to obtain job items of the successfully authenticated user as many as the number of job items to be obtained in the order of print jobs based on the job item display order setting information.

For example, in the job item display information shown in FIG. 10, since the number of job items to be obtained is set to "2" and the job item display order setting information is set to "chronological order", a request for job items of oldest and second oldest print jobs is sent to the print server device 15.

In step S26, the job item request unit 56 sends a request for job items to the print server device 15A. In step S27, the job item request unit 56 sends a request for job items to the print server device 15B. In step S28, the job item request unit 56 sends a request for job items to the print server device 15C.

In step S29, the job item selection unit 62 of the print server device 15A selects job items as many as the number of job items to be obtained based on the number of job items to be obtained and the job item display order setting information that have been received. For example, in the print job information shown in FIG. 11, the job item selection unit 62 selects job items: a print job with an oldest job ID "07" and a print job with a second oldest job ID "04" for User A. In step S30, the transmission and reception unit 61 of the print server device 15A transmits the job items selected by the job item selection unit 62 to the image formation device 14.

In step S31, the job item selection unit 62 of the print server device 15B selects job items as many as the number of job items to be obtained based on the number of job items to be obtained and the job item display order setting information that have been received. For example, in the print job information shown in FIG. 12, the job item selection unit 62 selects job items: a print job with an oldest job ID "04" and a print job with a second oldest job ID "05" for User A. In step S32, the transmission and reception unit 61 of the print server device 15B transmits the job items selected by the job item selection unit 62 to the image formation device 14.

In step S33, the job item selection unit 62 of the print server device 15C selects job items as many as the number of job items to be obtained based on the number of job items to be obtained and the job item display order setting information that have been received. For example, in the print job information shown in FIG. 13, the job item selection unit 62 selects job items: a print job with an oldest job ID "09" and a print job with a second oldest job ID "07" for User A. In step S34, the transmission and reception unit 61 of the print server device 15C transmits the job items selected by the job item selection unit 62 to the image formation device 14.

The transmission of the job items from the print server devices 15A-15C to the image formation device 14 in steps S30, S32, and S34 is performed asynchronously depending on the print server devices 15A-15C.

Figure 16:
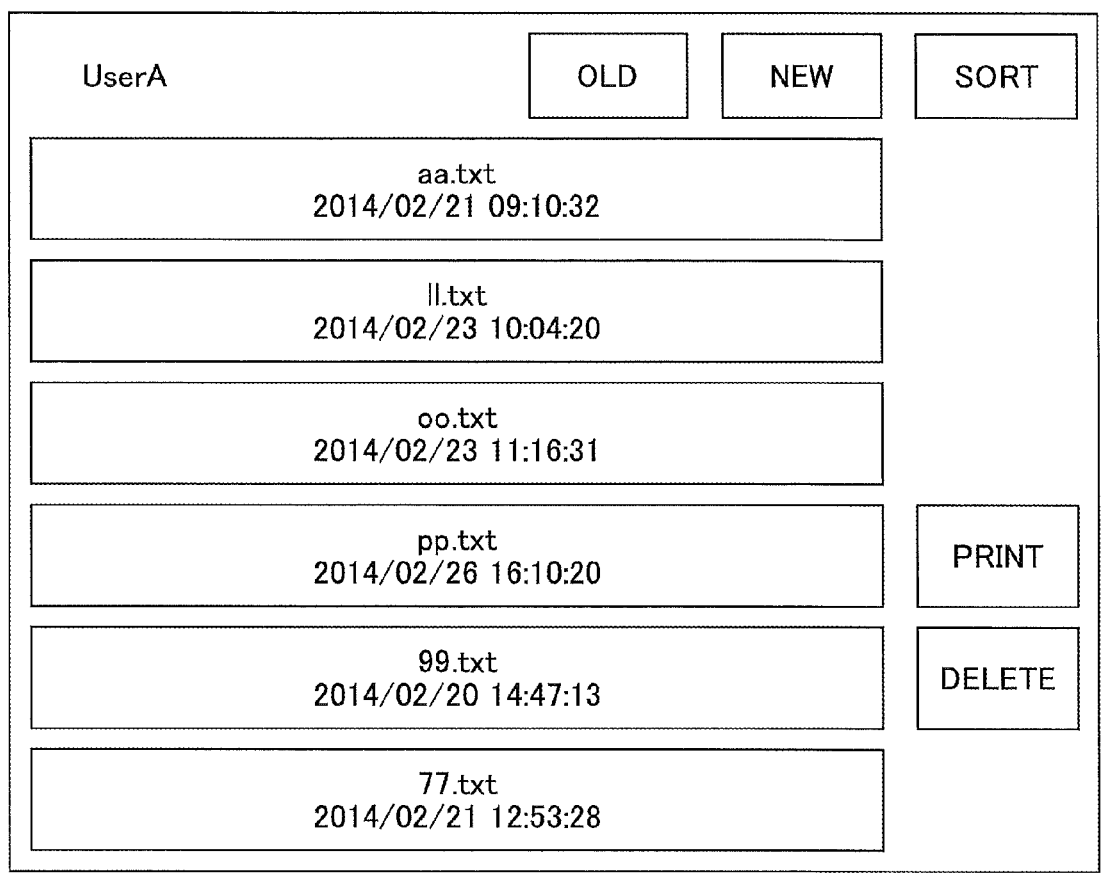
FIG. 16 is an illustration of an example of a job list screen.

Following reception of the job items from the print server devices 15A-15C to which the request for job items is sent, in step S35, the display unit 52 of the image formation device 14 displays the job items as shown in FIG. 16.

FIG. 16 is an illustration of a job list screen. The job list screen of FIG. 16 displays the job items in order of reception from the print server devices 15A-15C. For example, in the job list screen of FIG. 16, the job items received from the print server device 15A are displayed in an upper portion of the job list screen. Further, the job items received from the print server device 15B are displayed in a middle portion of the job list screen and the job items received from the print server device 15C are displayed in a lower portion of the job list screen.

The user can arrange the job items by pressing a "Sort" button on the job list screen of FIG. 16 (step S36 in FIG. 15). When the Sort button is pressed, the job item arrangement processing unit 57 arranges the job items received in steps S30, S32, and S34 in chronological order as shown in FIG. 17 (step S37 in FIG. 15).

FIG. 17 is an illustration of an example of an arranged job list screen. In the job list screen of FIG. 17, the job items are arranged in chronological order by date and time regardless of the print server devices 15A-15C from which the job items are received. The display unit 52 displays the job items of FIG. 17 that are arranged in chronological order.

<<Process to Obtain and Display Job Items Anew>>

Figure 18:
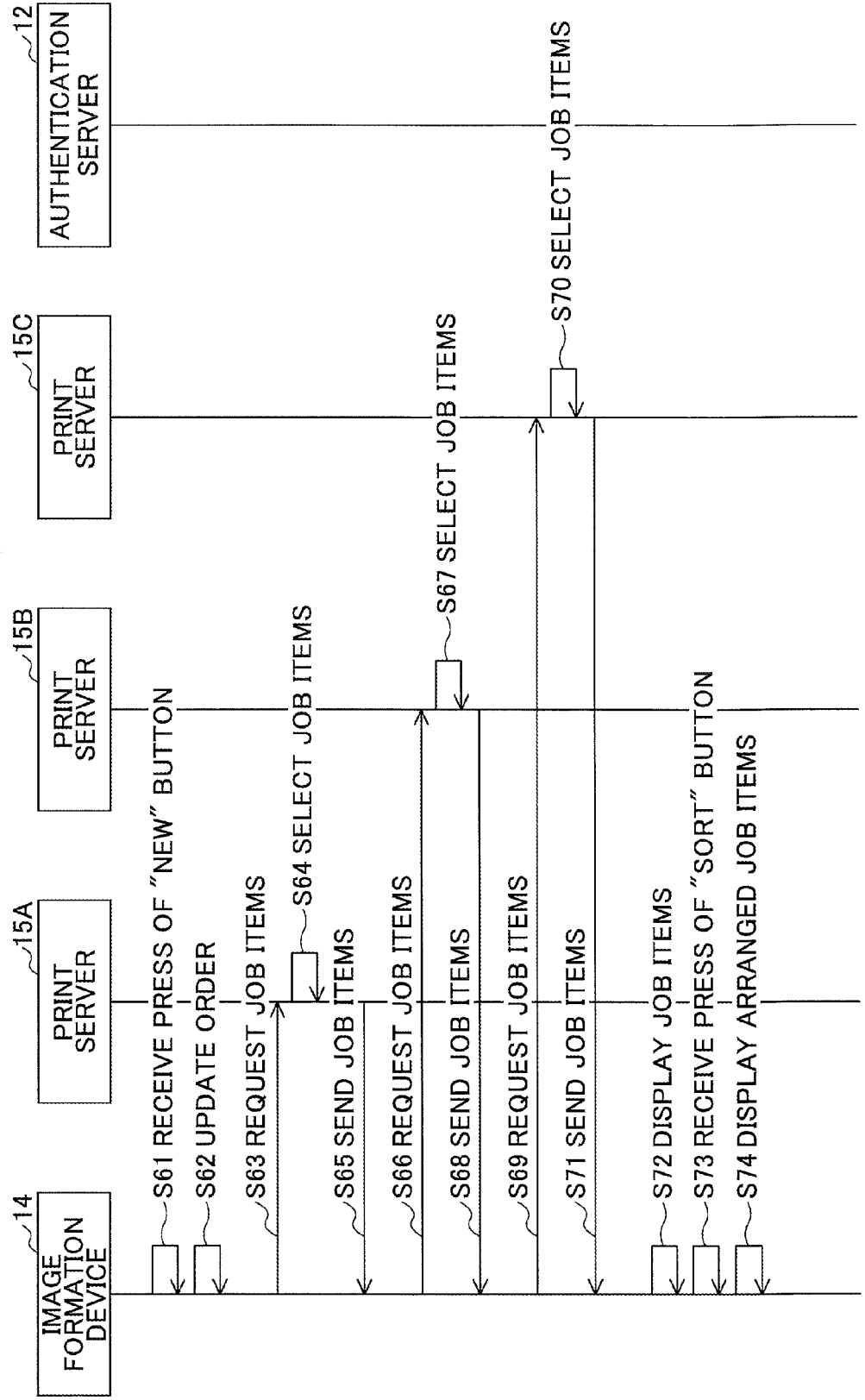
FIG. 18 is a sequence diagram of an example of a process to obtain and display job items anew.

By pressing a "New" button in FIG. 16 or FIG. 17, the user can obtain, from the print server device 15, job items anew with a condition (reverse chronological order) different from a condition applied to the sequence diagram of FIG. 15, and display the job items again. FIG. 18 is a sequence diagram of a process to obtain and display the job items anew.

In step S61, the user operates the operation panel 602 of the image formation device 14 to press the "New" button in FIG. 16 or FIG. 17. The New button in FIG. 16 or FIG. 17 is an example of a job item display order changing button. In step S62, the job item display information setting unit 54 updates the job item display order setting information stored in the job item display information storage unit 59 to be "reverse chronological order".

The job item request unit 56 sends a request for job items based on the successfully authenticated user, the number of job items to be obtained, and the job item display order setting information to all print server devices 15 storing print jobs.

In other words, the job item request unit 56 sends, to the print server device 15, a request to obtain job items of the successfully authenticated user as many as the number of job items to be obtained in the order of print jobs based on the job item display order setting information.

For example, in the job item display information, since the number of job items to be obtained is set to "2" and the job item display order setting information is set to "reverse chronological order", a request for job items of latest and second latest print jobs is sent to the print server device 15.

In step S63, the job item request unit 56 sends a request for job items to the print server device 15A. In step S64, the job item selection unit 62 of the print server device 15A selects job items as many as the number of job items to be obtained based on the number of job items to be obtained and the job item display order setting information that have been received. For example, in the print job information shown in FIG. 11, the job item selection unit 62 selects job items: a print job with a latest job ID "01" and a print job with a second latest job ID "04" for User A. In step S65, the transmission and reception unit 61 of the print server device 15A transmits the job items selected by the job item selection unit 62 to the image formation device 14.

In step S66, the job item request unit 56 of the image formation device 14 sends a request for job items to the print server device 15B. In step S67, the job item selection unit 62 of the print server device 15B selects job items as many as the number of job items to be obtained based on the number of job items to be obtained and the job item display order setting information that have been received. For example, in the print job information shown in FIG. 12, the job item selection unit 62 selects job items: a print job with a latest job ID "07" and a print job with a second latest job ID "09" for User A. In step S68, the transmission and reception unit 61 of the print server device 15B transmits the job items selected by the job item selection unit 62 to the image formation device 14.

In step S69, the job item request unit 56 of the image formation device 14 sends a request for job items to the print server device 15C. In step S70, the job item selection unit 62 of the print server device 15C selects job items as many as the number of job items to be obtained based on the number of job items to be obtained and the job item display order setting information that have been received. For example, in the print job information shown in FIG. 13, the job item selection unit 62 selects job items: a print job with a latest job ID "05" and a print job with a second latest job ID "01" for User A. In step S71, the transmission and reception unit 61 of the print server device 15C transmits the job items selected by the job item selection unit 62 to the image formation device 14.

The transmission of the job items from the print server devices 15A-15C to the image formation device 14 in steps S65, S68, and S71 is performed asynchronously depending on the print server devices 15A-15C.

In step S72, following reception of the job items from the print server devices 15A-15C to which the request for job items is sent, the display unit 52 of the image formation device 14 displays the job items as shown in FIG. 19.

FIG. 19 is an illustration of a job list screen. The job list screen of FIG. 19 displays the job items in order of reception from the print server devices 15A-15C. For example, in the job list screen of FIG. 19, the job items received from the print server device 15A are displayed in an upper portion of the job list screen. Further, the job items received from the print server device 15B are displayed in a middle portion of the job list screen and the job items received from the print server device 15C are displayed in a lower portion of the job list screen.

The user can arrange the job items by pressing the "Sort" button on the job list screen of FIG. 19 (step S73 in FIG. 18). When the Sort button is pressed, the job item arrangement processing unit 57 arranges the job items received in steps S65, S68, and S71 in reverse chronological order as shown in FIG. 20 (step S74 in FIG. 18).

FIG. 20 is an illustration of an arranged job list screen. In the job list screen of FIG. 20, the job items are arranged in reverse chronological order by date and time regardless of the print server devices 15A-15C from which the job items are received. The display unit 52 displays the job items of FIG. 20 that are arranged in reverse chronological order.

The job list screens in FIGS. 16, 17, 19, and 20 show where the job items received from the print server devices 15 can be displayed all together. However, if the number of job items to be obtained is greater or the number of the print server devices 15 that store print jobs is larger, job items received from the print server devices 15 may not be able to be displayed on the job list screen all together.

In this case, the image formation device 14 may receive a scroll operation from the user such as a swipe operation (an operation to stroke a screen in a specific direction while the finger remains in contact with the screen) and successively display job items received from the print server devices 15.

Figure 21:
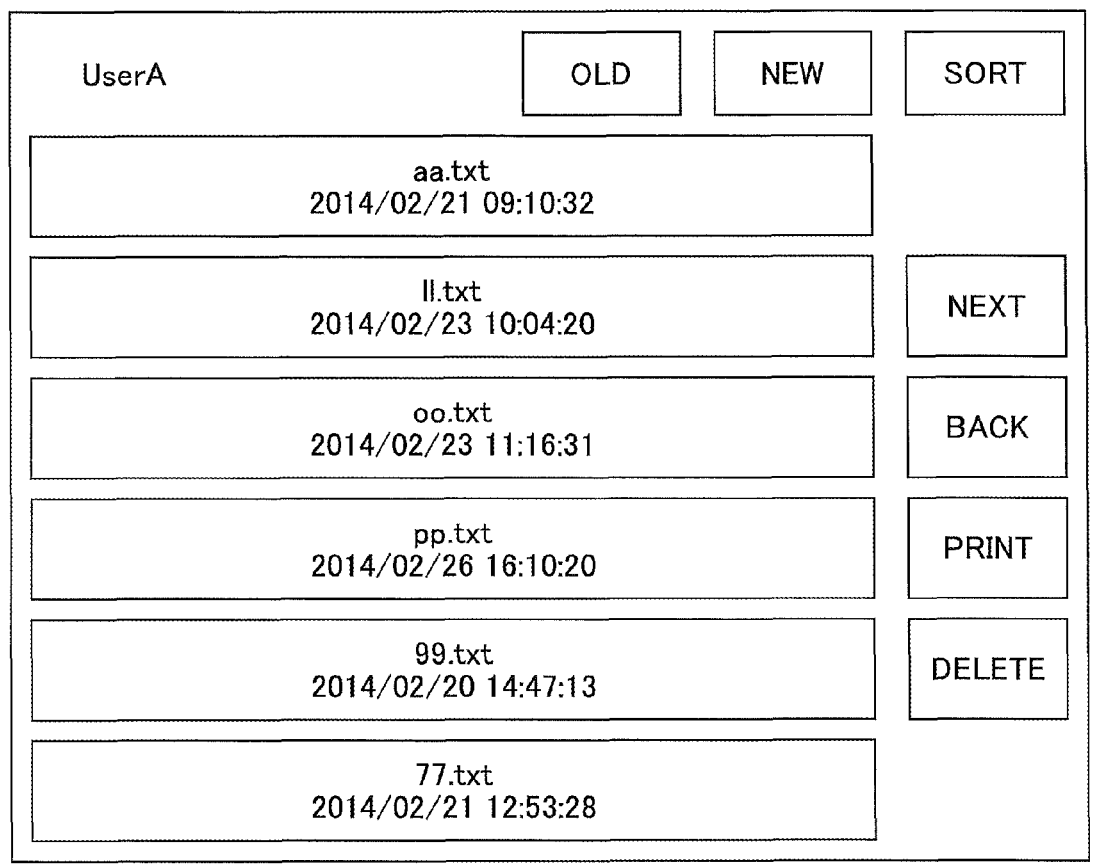
FIG. 21 is an illustration of another example of a job list screen.

Further, as shown in a job list screen of FIG. 21, the image formation device 14 may have a "Next" button and a "Back" button for receiving, from the user, an operation to successively display job items received from the print server device 15.

When the swipe operation or an operation by the "Next" button is received from the user, if such an operation to display lower job items is performed by the user while a bottom job item is being displayed, the image formation device 14 performs a process as follows.

In a case of the sequence diagram in FIG. 18, for example, the job item request unit 56 of the image formation device 14 sends a request to receive job items that follow job items received in steps S65, S68, and S71 to the print server devices 15A-15C. The display unit 52 of the image formation device 14 can display job items received from the print server devices 15A-15C following the bottom job item.

The image formation device 14 can receive, from the user, a request to obtain job items for which a condition is specified by an "Old" button or a "New" button in FIG. 21 and a request to obtain job items specified to follow job items received from the print server device 15.

In this manner, the image formation device 14 can receive, from the user, a request to obtain job items for which a condition is specified, a request to obtain continuous job items with the same condition, and a request to arrange obtained job items from the job list screen shown in FIG. 21, for example.

While "chronological order" and "reverse chronological order" are described as an example of the job item display order setting information in the present embodiment, various conditions such as ascending or descending alphabetical or Japanese alphabetical order, descending or ascending order of a data amount, and the like may be set. The job item display order setting information may be any condition that can change the order of the job item display.

<Other Example of Software Configuration>

<<Image Formation Device>>

Figure 22:
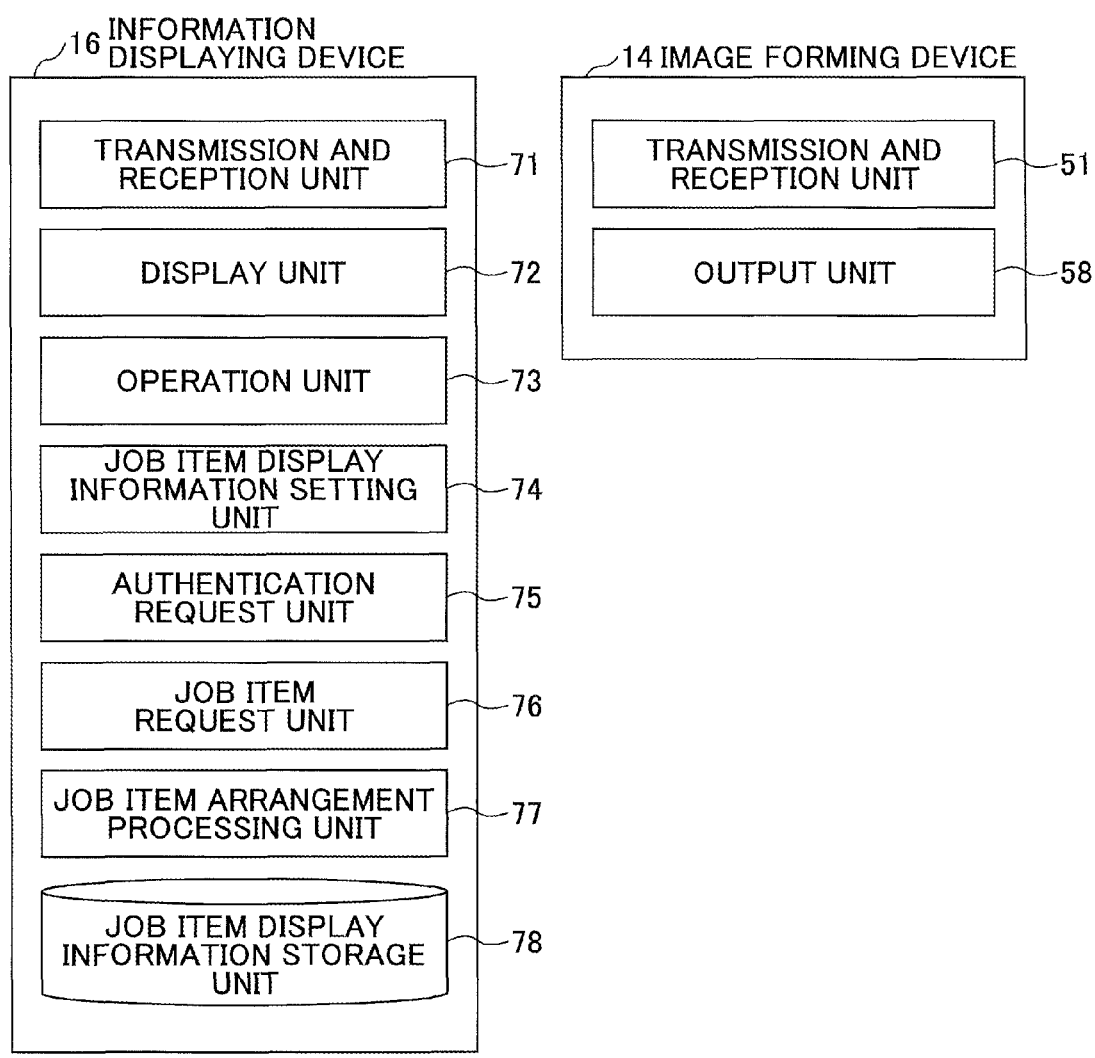
FIG. 22 is a process block diagram of another example of an image formation device according to an embodiment.

The image formation device 14 of FIG. 7 may be realized by the image formation device 14 and an information displaying device 16 shown in FIG. 22. FIG. 22 is a process block diagram of another example of an image formation device according to the present embodiment. In FIG. 22, process blocks that constitute the image formation device 14 of FIG. 7 are divided into the image formation device 14 and the information displaying device 16.

The image formation device 14 and the information displaying device 16 are connected in a wired or wireless manner to be able to perform data communication. The image formation device 14 and the information displaying device 16 may have direct access by using short distance wireless communication such as Bluetooth, infrared rays, or the like or may have access via a network such as a LAN.

The information displaying device 16 may be realized by an information processing device configured to include a controller, hard keys, a liquid crystal touch panel, or the like. Further, the information displaying device 16 may be realized by an information processing device such as a smartphone, a tablet, or the like.

The information displaying device 16 implements a transmission and reception unit 71, a display unit 72, an operation unit 73, a job item display information setting unit 74, an authentication request unit 75, a job item request unit 76, a job item arrangement processing unit 77, and a job item display information storage unit 78 by executing a program. The image formation device 14 implements a transmission and reception unit 51 and an output unit 58 by executing a program.

Since the processing blocks of the image formation device 14 and the information displaying device 16 in FIG. 22 are the same as those in FIG. 7, descriptions thereof are omitted. According to the configuration shown in FIG. 22, the information displaying device 16 can perform data communication with the authentication server device 12, the administrator terminal 13, and the print server device 15 directly or via the image formation device 14.

The information displaying device 16 can receive a number of job items to be obtained and job item display order setting information from the administrator terminal 13, and send a request for job items based on the number of job items to be obtained and the job item display order setting information to the print server device 15. Accordingly, the information displaying device 16 is capable of displaying job items received from the print server device 15 as mentioned above.

CONCLUSION

In the printing system 1 according to the present embodiment, a request for job items based on the number of job items to be obtained and the job item display order setting information is sent from the image formation device 14 to all of the print server devices 15 that store print jobs. Then, the image formation device 14 displays job items in order of reception from the print server devices 15.

By pressing the "Sort" button, the user can arrange job items displayed in the image formation device 14 with a condition such as chronological order within a range of job items obtained from the print server device 15.

If a desired print job is not included in the job items displayed in the image formation device 14, by pressing a button for a different condition such as the "New" button, it is possible to display job items obtained anew with a different condition from the print server device 15.

According to the printing system 1 of the present embodiment, even if print jobs that exceed the number of job items to be obtained are stored in the print server device 15, it is possible to easily display job items including a print job desired by the user.

The present invention is not limited to the above specifically described embodiment but various variations and modifications may be made without departing from the scope of the Claims.

The image formation device 14 is an example of a job processing apparatus. The display unit 52 is an example of a display unit. The job item request unit 56 is an example of a job item request unit. The job item arrangement processing unit 57 is an example of an arrangement processing unit.

The printing system 1 is an example of an information processing system. The job item selection unit 62 is an example of a job item selection unit. The print server device 15 is an example of an information storage device. The job item is an example of a job item.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general-purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Further, the present invention is not limited to these embodiments, and various variations and modifications may be made without departing from the scope of the present invention.

The present application is based on and claims the benefit of priority of Japanese Priority Patent Application No. 2014-070963 filed on Mar. 31, 2014, the entire contents of which are hereby incorporated by reference.

What is claimed is:

1. A job processing apparatus for displaying a job list of one or more selected job items, the selected job items being selected from one or more stored job items that are stored in a storage remote from the job processing apparatus, the job processing apparatus comprising:
   a communication interface for connecting to a network;
   a non-transitory computer-readable medium having computer readable instructions stored therein,
   a processor configured to execute the computer-readable instructions such that the processor is configured to,
      send a job list acquisition request via the network for displaying the job list,
      receive the job list in response to the job list acquisition request, the job list including the one or more selected job items selected from the one or more stored job items based on a first condition, a number of the selected job items included in the received job list being less than a first number, and
   display the received job list on a screen of a display, the screen including a job item display area, a first instruction area and a second instruction area, the job item display area displaying at least a portion of the one or more selected job items in the job list based on a second condition, a number of the selected job items displayed on the job item display area simultaneously being less than a second number, the first instruction area being for accepting a first user instruction to change the first condition and send the job list acquisition request based on the changed first condition, the second instruction area being for accepting a second user instruction to change the second condition and display the portion of the one or more selected job items on the job list display area based on the changed second condition.

2. The job processing apparatus as claimed in claim 1, wherein
   the processor is configured to execute the computer-readable instructions to display the first instruction area such that the first instruction area includes a plurality of selectable conditions for designating the first condition.

3. The job processing apparatus as claimed in claim 2, wherein the plurality of selectable conditions are orders in which at least one information storage device selects one or more job items acquired from the one or more stored jobs items based on the selected conditions.

4. The job processing apparatus as claimed in claim 3, wherein the processor is further configured to send the job list acquisition request based on the changed first condition to change a selected order of the orders and to acquire the job list based on the changed first condition.

5. The job processing apparatus as claimed in claim 1, wherein
while a last job item of the portion of the one or more selected job items is displayed on the display, if a user operation to display job items that follow the last job item is received, the processor is further configured to, send a second request indicating both the number of the stored job items requested and a same condition as applied to the job items being displayed, thereby obtaining the job items that follow the last job item.

6. The job processing apparatus as claimed in claim 1, wherein the processor is further configured to,
display the job items according to an order of the job items being received from at least one information storage device.

7. The job processing apparatus as claimed in claim 1, wherein
the job processing apparatus is an output device; and
the first condition indicates an order for at least one information storage device to retrieve the job items including output data.

8. The job processing apparatus as claimed in claim 1, wherein
the processor is further configured to,
send to at least one information storage device a second request after the display displays the received job items in accordance with the job list acquisition request, the second request indicating the number of job items and the first condition; and
receive a second portion of the job items associated with the second request, the second portion of the job items following the first portion of the job items received.

9. An information processing system comprising:
at least one information storage device for storing a plurality of job items;
a first non-transitory computer-readable medium having first computer-readable instructions stored therein; and
a first processor configured to execute the first computer-readable instructions such that the first processor is configured to send to the at least one information storage device a job list acquisition request, the job list acquisition request including a number of job items requested and a first condition associated with the number of job items requested, wherein
the at least one information storage device includes,
a second non-transitory computer-readable medium having second computer-readable instructions stored therein, and
a second processor configured to execute the second computer-readable instructions such that the second processor is configured to receive the job list acquisition request from the first processor, select a first portion of the job items in accordance with the job list acquisition request, and send the selected job items as a job list to the first processor,
the first processor is configured to display the job list on a screen of a display, the screen including a job item display area, a first instruction area and a second instruction area, the job item display area displaying at least a portion of the selected job items in the job list based on a second condition, the first instruction area being for accepting a first user instruction to change the first condition and send the job list acquisition request based on the changed first condition, the second instruction area being for accepting a second user instruction to change the second condition and display the selected job items on the job list display area based on the changed second condition.

10. The information processing system as claimed in claim 9, wherein,
the processor is configured to execute the computer-readable instructions to display the first instruction area such that the first instruction area includes a plurality of selectable conditions for designating the first condition.

11. The information processing system as claimed in claim 10, wherein the plurality of selectable conditions are orders in which the at least one information storage device selects the first portion of the job items from the job items stored in the at least one information storage device based on the selected condition.

12. The information processing system as claimed in claim 11, wherein the first processor is further configured to cause the at least one information storage to change a selected order of the orders such that the at least one information storage device selects a second portion of job items in an ascending order or in a descending order from the job items stored in the at least one information storage device in accordance with the number of job items requested.

13. The information processing system as claimed in claim 9, wherein the first processor is further configured to,
send to the at least one information storage device a second request, the second request indicating the number of job items requested and the first condition, and
receive a second portion of the job items associated with the second request, the second portion of the job items following the first portion of the job items received.

14. The information processing system as claimed in claim 9, wherein processor is configured to execute the computer-readable instructions to,
display the job items according to an order of the first portion of the job items being received from the at least one information storage device.

15. A method for displaying a plurality of job items in an information processing system including at least one information storage device for storing jobs and a job processing apparatus for displaying job items, the at least one information storage device and the job processing apparatus being connected to each other to perform data communication, the method comprising:
sending to the at least one information storage device a job list acquisition request, the job list acquisition request including a number of job items requested and a first condition associated with the number of requested job items;
receiving from the at least one information storage device a first portion of the job items as a job list in accordance with the job list acquisition request; and
displaying the job list on a screen of a display, the screen including a job item display area, a first instruction area and a second instruction area, the job item display area displaying at least a portion the received job items in the job list based on a second condition, the first instruction area being for accepting a first user instruction to change the first condition and send the job list acquisition request based on the changed first condition, the second instruction area being for accepting a second user instruction to change the second condition and display the portion of the received job items on the job list display area based on the changed second condition.

16. The method as claimed in claim 15, further comprising:
displaying the first instruction area such that the first instruction area includes a plurality of selectable conditions for designating the first condition.

17. The method as claimed in claim 16, wherein the plurality of selectable conditions are orders in which the at least one information storage device selects the first portion of job items from the jobs items stored in the at least one information storage device.

18. The method as claimed in claim 17, wherein the selected condition causes the job processing apparatus to change an order in which the at least one information storage device selects a second portion of the job items in an ascending order or in a descending order from the job items stored in the at least one information storage device and in accordance with the number of job items requested.

19. The method as claimed in claim 15, further comprising:
sending to the at least one information storage device a second request, the second request indicating the number of job items requested and the first condition; and
receiving a second portion of the job items associated with the second request, the second portion of the job items following the first portion of the job items received.

20. The method as claimed in claim 15, further comprising:
displaying the job items on the display according to an order of the first portion of the job items being received from the at least one information storage device.

* * * * *